United States Patent [19]

Nishimura et al.

[11] 4,133,798

[45] Jan. 9, 1979

[54] FLUOROCOPOLYMER COMPOSITION HAVING IMPROVED TRANSPARENCY

[75] Inventors: Hiromichi Nishimura; Masahiko Ichimura, both of Yokohama, Japan

[73] Assignee: Asahi Glass Company Ltd., Tokyo, Japan

[21] Appl. No.: 869,273

[22] Filed: Jan. 13, 1978

[30] Foreign Application Priority Data

Jan. 19, 1977 [JP] Japan .................................. 52-4005

[51] Int. Cl.² ............................ C08K 5/01; C08K 5/04
[52] U.S. Cl. ........................ 260/45.7 R; 260/45.85 R; 428/500; 526/1; 526/5; 526/255
[58] Field of Search .............................. 526/1, 5, 255; 260/45.7 R, 45.85, 45.95

[56] References Cited

U.S. PATENT DOCUMENTS

| | | | |
|---|---|---|---|
| 2,965,595 | 12/1960 | Brinker et al. | 260/45.7 R |
| 3,172,872 | 3/1965 | Kraus et al. | 260/45.7 R |
| 3,671,488 | 6/1972 | Stuetz | 260/45.7 R |
| 3,767,638 | 10/1973 | Johnson | 526/1 |
| 3,893,971 | 7/1975 | Ukihashi et al. | 526/255 |

*Primary Examiner*—Harry Wong, Jr.
*Attorney, Agent, or Firm*—Oblon, Fisher, Spivak, McClelland & Maier

[57] ABSTRACT

Transparency of an ethylene-tetrafluoroethylene type copolymer is improved by an addition of at least one condensed ring compound selected from the group consisting of anthracenes, phenanthrenes, anthraquinones phenanthrenequinones and substituted derivatives thereof.

6 Claims, 1 Drawing Figure

CURVES OF PERCENT TRANSMITTANCE
(THICKNESS OF FILM 50μ)

FLUOROCOPOLYMER COMPOSITION HAVING IMPROVED TRANSPARENCY

BACKGROUND OF THE INVENTION

Field of the Invention

The present invention relates to a fluorocopolymer composition having improved transparency, more particularly, it relates to a film or sheet made of a fluorocopolymer composition having improved transparency and high ultraviolet ray absorbancy and high heat aging resistance.

Description of the Prior Arts

Ethylene-tetrafluoroethylene type copolymers have been known as melt processable materials having excellent heat resistance, chemical resistance and electrical and mechanical characteristics.

The ethylene-tetrafluoroethylene type copolymers having excellent weather durability can be effectively used as protective coating materials for various products. For example, the protective effect can be attained by covering various products with the ethylene-tetrafluoroethylene type copolymer film or by coating various products by a heat melt coating method. It is also possible to attain the protective cover by using a composite film prepared by laminating a common synthetic resin film with the ethylene-tetrafluoroethylene type copolymer film.

The inventors have studied and found that the ethylene-tetrafluoroethylene type copolymer film is not suitable for the usages requiring transparency because the transparency of the film is remarkably lowered depending upon an increase of the thickness of the film.

Various methods for improving transparency of crystalline polymers have been proposed. For example, the method of modifying a polymer itself, the method of quenching in a molding process of a polymer and the method of adding a suitable additive have been proposed. The method of adding an additive is preferable from the viewpoint of the accomplishment of the purpose without modifying the synthesis of the polymer and the molding process. It has not been considered to improve transparency by an addition of an additive to a ethylene-tetrafluoroethylene type copolymer.

SUMMARY OF THE INVENTION

It is an object of the present invention to provide a fluorocopolymer composition such as ethylene-tetrafluoroethylene type copolymer composition having improved transparency.

It is another object of the present invention to provide a fluorocopolymer composition such as ethylene-tetrafluoroethylene type copolymer composition having excellent heat aging resistance.

It is the other object of the present invention to provide an ethylene-tetrafluoroethylene type copolymer composition which has high ultraviolet ray absorbancy and which is suitable as a source for a film being effective for weather durable protective covering.

The foregoing and other objects of the present invention have been attained by providing a fluorocopolymer composition comprising a small amount of at least one condensed ring compound selected from the group consisting of anthracenes, phenanthranes anthraquinones phenanthrenequinones and substituted derivatives thereof.

DETAILED DESCRIPTION OF THE PREFERRED EMBODIMENTS

Figure 1:
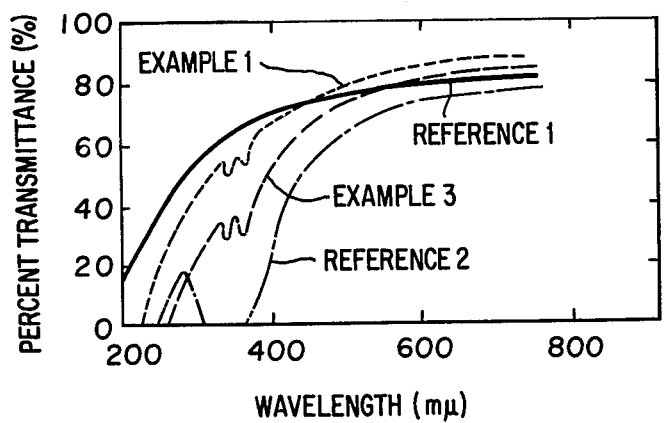

The fluorocopolymers used in the present invention include copolymers have a fluoroolefin component especially a tetrafluoroethylene component. The typical fluorocopolymers are ethylene-tetrafluoroethylene type copolymers.

The ethylene-tetrafluoroethylene type copolymers used in the invention can be prepared by various polymerization methods such as an emulsion polymerization, a suspension polymerization, a solution polymerization and a vapor phase polymerization, which can be initiated chemically or which can be radiation-induced.

The ratio of tetrafluoroethylene to ethylene in the copolymers can be selected from a broad range and a component of other comonomer such as propylene, isobutyrene, vinyl fluoride, hexafluoropropylene, chlorotrifluoroethylene, acrylic acid, alkyl acrylate, chloroethyl vinyl ether, perfluorovinyl ether etc. can be added at a ratio of up to 30 mole % especially 0.1 to 15 mole %.

Suitable molar ratio of tetrafluoroethylene to ethylene is in a range of about 40:60 to 70:30 especially 45:55 to 60:40.

It is especially preferable to use an ethylene-tetrafluoroethylene type copolymer having a below-defined volumetric melt flow rate of about 10 to 300 mm$^3$/sec. especially about 20 to 160 mm$^3$/sec.

These copolymers have excellent heat resistance, chemical resistance and electrical and mechanical characteristics, and also excellent melt processability.

The term of "volumetric melt flow rate" means the following. 1 g of a sample of the polymer is extruded through a nozzle having a diameter of 1 mm and a land of 2 mm under a predetermined pressure of 30 kg/cm$^2$ at a predetermined temperature by using a Flow tester. The volume of the molten sample extruded per unit time is shown as the volumetric melt flow rate and the unit is mm$^3$/sec.

The specific temperature is selected from the range of 260° to 360° C. and a temperature higher than the thermal decomposition initiation temperature is not used in the measurement of the volumetric melt flow rate.

Suitable condensed ring compounds used in the present invention are anthracenes and phenanthrenes. The anthracenes and phenanthranes are colorless and impart excellent heat aging resistance improving effect whereby they are especially advantageous. The quinone derivatives of anthracenes and phenanthrenes such as anthraquinone, phenanthrenequinone can be also used as the condensed ring compound.

The anthracenes and phenanthranes having suitable substituent or various derivatives having anthracene ring or phenanthrene ring which have a boiling point of higher than 250° C. and are not decomposed at the fabrication temperature of the ethylene-tetrafluoroethylene type copolymer and have high miscibility to the ethylene-tetrafluoroethylene type copolymer can be also used.

The substituents can be alkyl, aryl, alkoxy, hydroxyl and carboxyl groups and halogen atoms etc.

The specific condensed ring compound is added at a ratio of 0.05 to 20 wt. parts especially 0.5 to 5 wt. parts per 100 wt. parts of the fluorocopolymer. When the amount of the specific condensed ring compound is too small, the ultraviolet ray absorbancy improving effect and the transparency improving effect are not found.

On the other hand, when it is too much, the excellent characteristics of the fluorocopolymer are deteriorated.

One or more of the specific condensed ring compounds can be added.

In the composition of the present invention, it is possible to add other additives such as ultraviolet absorbents or sunproofing agents as far as the effect of the addition of the specific condensed ring compound is not diminished.

It is also possible to add other suitable additives such as heat stabilizers, reinforcing agents, fillers, lubricants and pigments depending upon the usage of the composition of the invention.

For example, in the usage for weather durability, the improvements of the surface hardness, mechanical strength, wearing resistance and others can be attained by the addition of suitable other additives.

The method of addition of the specific condensed ring compound is not limited in the present invention. Thus, it is preferable to employ the method of homogeneously mixing the fluorocopolymer with the specific condensed ring compound. It is preferable to consider effective methods for example, to mix the condensed ring compound after pulverizing it into particles having suitable particle size and distribution, or to use the fluorocopolymer after pulverizing it or in a molten condition or to add the condensed ring compound in a wet mixing method after dispersing the fluorcopolymer in an aqueous medium or an organic medium.

The composition of the present invention can be used to obtain various forms of fabricated products by various processing or fabricating processes, for example, a press-molding process, an extrusion molding process, an injection molding process, a lining process, a coating process and a wire covering process.

Suitable ethylene-tetrafluoroethylene type copolymers used in the invention have a melt flow initiation temperature of about 260° to 300° C. and a thermal decomposition temperature of about 320° to 360° C.

The heat melt temperature for the fluorocopolymer is usually selected from the temperature range from the melt flow initiation temperature to the thermal decomposition initiation temperature, especially about 260° to 360° C.

The compositions of the present invention have excellent ultraviolet ray shielding effect and heat aging resistance to be effective for usages requiring weather durabilty and the compositions have transparency to be effective for usage requiring transparency. The compositions are especially effectively used as heat resistant anticorrosion protective coatings especially in the usage requiring weather durability, anticorrosion protective coatings for heat insulation and meters; protective coatings for polyvinyl chloride and fiber reinforced panels; coatings for road markings; protective coatings for signboard, walls and coatings for steel.

The compositions can be also used for transparent weather durable protective coatings for soundproof walls.

The film fabricated from the composition of the present invention itself can be used for the protective coatings. Thus, it is preferable to use the film by laminating the other synthetic resin film in the commercial uses for various fields.

Having generally described the present invention, a further understanding can be obtained by reference to certain specific examples which are provided herein for purposes of illustration only and are not intended to be limiting unless otherwise specified.

EXAMPLES 1 TO 7 AND REFERENCES 1 TO 2

An ethylene-tetrafluoroethylene copolymer having a molar ratio of $C_2F_4/C_2H_4$ of 52:48, and a melt flow initiation temperature of 279° C., a thermal decomposition initiation temperature of 345° C. and a volumetric flow of 46 mm$^3$/sec. at 300° C. and the specific amount of each condensed ring compound shown in Table 1 were blended and kneaded in an extrusion molding machine to fabricate each film having a thickness of 50μ. The characteristics of the resulting films have been measured. Percent transmittances of ultraviolet ray and visible ray of the films having a thickness of 50μ were measured. The results are shown in FIG. 1.

When phenanthrene or anthracene was added, the percent transmittance of ultraviolet ray (less than 400 mμ) was lowered to effectively shut out ultraviolet ray in comparision with that of Reference 1 (no additive). When the amount of phenanthrene or anthracene was more than 5 wt. %, the effect was remarkable. On the contrary, the percent transmittance of the visible ray was increased by the addition of the condensed ring compound to improve transparency. However, when 10 wt. % of phenanthrene was added, phenanthrene was deposited on the surface of the film to deteriorate the appearance of the film. As Reference 2, the commercialized ultraviolet absorbent "Tinuvin ®327" (manufactured by Ciba-Geigy AG: 2(2'-hydroxy 3', 5'-di-t-butylphenyl)5-chlorobenzotriazole) was added and the characteristics of the film are shown.

It is clear that the percent transmittance of visible ray in the case of the addition of phenanthrene was higher than that of the addition of Tinuvin ®327 though the ultraviolet ray absorption was smaller.

Table 1

| | | Additive | Amount (wt.%) | Percent transmittance(%)[b] | Heat aging resistance (hr)[c] |
|---|---|---|---|---|---|
| Example | 1 | phenanthrene | 1 | 85 | — |
| " | 2 | " | 2 | 84 | 770 |
| " | 3 | " | 5 | 82 | — |
| " | 4 | " | 10[a] | 81 | — |
| " | 5 | anthracene | 1 | 81 | 1300 |
| " | 6 | phenanthrene-1-carboxylic acid | 2 | 82 | — |
| " | 7 | anthraquinone | 1 | 81 | 460 |
| Reference | 1 | none | none | 80 | 105 |
| " | 2 | Tinuvin ®327 | 1 | 74 | — |

Note:
[a]Blooming was found.
[b]Measured at the wave length of 600 mμ.
[c]The heating time as 230° C required for the elongation at 23° C becomes one-half of the initial value.

EXAMPLE 8

An ethylene-tetrafluoroethylene copolymer having a molar ratio of $C_2F_4/C_2H_4$ of 52 : 48 and a melt flow initiation temperature of 276° C., a thermal decomposition initiation temperature of 352° C. and a volumetric flow of 85 mm$^3$/sec. at 300° C. was admixed with 2 wt. parts of phenanthrene per 100 wt. parts of the copolymer and the mixture was blended at 330° C. on a roll mill for 15 minutes, and the resulting composition was press-molded at 300° C. to form a sheet having a thickness of 0.7 mm. On the other hand, the ethylene-tetrafluoroethylene copolymer was press-molded at 300° C.

to form a sheet having a thickness of 0.7 mm. The transparency of the former sheet was remarkably superior to the latter sheet.

EXAMPLE 9

An ethylene-tetrafluoroethylene copolymer having a molar ratio of $C_2F_4/C_2H_4$ of 50 : 50 and a melt flow initiation temperature of 283° C., a thermal decomposition initiation temperature of 349° C. and a volumetric flow of 120 mm$^3$/sec. at 300° C. was admixed with 4 wt. parts of anthracene per 100 wt. parts of the copolymer, and the mixture was extruded at 310° C. to form filaments having a diameter of 100μ. The transparency of the filaments was superior to that of the filaments prepared without the addition of anthracene.

What is claimed is:
1. A fluorocopolymer composition having improved transparency and high ultraviolet absorbancy, which comprises
   100 wt. parts of a fluorocopolymer having a tetrafluoroethylene component and an ethylene component in a molar ratio of $C_2F_4/C_2H_4$ of 60:40 to 40:60;
   0.05 to 20 wt. parts of a condensed ring compound selected from the group consisting of anthracenes, phenanthrenes, anthraquinones, phenanthrenequinones, substituted derivatives thereof and mixtures thereof; and
   optionally up to 30 mole percent of another comonomer component; wherein the heat melt temperature of said fluorocopolymer is 260° to 360° C.; and wherein said condensed ring compound has a boiling point higher than 250° C., is not decomposed at the fabrication temperature of said fluorocopolymer and is miscible with said fluorocopolymer.
2. A fluorocopolymer composition according to claim 1 wherein the condensed ring compound has no substituent.
3. A fluorocopolymer composition according to claim 1 wherein the condensed ring compound is anthracene or phenanthrene.
4. A fluorocopolymer composition according to claim 1 wherein the condensed ring compound is anthraquinone.
5. A fluorocopolymer composition according to claim 1 wherein the fluorocopolymer has a volumetric melt flow rate of 10 to 300 m$^3$/second.
6. A fluorocopolymer composition according to claim 1 wherein the amount of the condensed ring compound is 0.5 to 5 wt. parts.

* * * * *